United States Patent
Wang et al.

(10) Patent No.: US 9,834,381 B2
(45) Date of Patent: Dec. 5, 2017

(54) METHOD FOR CARBON DIOXIDE SEQUESTRATION

(71) Applicant: National Technology & Engineering Solutions of Sandia, LLC, Albuquerque, NM (US)

(72) Inventors: Yifeng Wang, Albuquerque, NM (US); Charles R. Bryan, Albuquerque, NM (US); Thomas Dewers, Albuquerque, NM (US); Jason E. Heath, Edgewood, NM (US)

(73) Assignee: National Technology & Engineering Solutions of Sandia, LLC, Alburquerque, NM (US)

( * ) Notice: Subject to any disclaimer, the term of this patent is extended or adjusted under 35 U.S.C. 154(b) by 0 days.

(21) Appl. No.: 14/825,869

(22) Filed: Aug. 13, 2015

(65) Prior Publication Data

US 2015/0345259 A1    Dec. 3, 2015

Related U.S. Application Data

(63) Continuation of application No. 13/951,036, filed on Jul. 25, 2013, now Pat. No. 9,139,364.

(60) Provisional application No. 61/675,677, filed on Jul. 25, 2012.

(51) Int. Cl.
*E21B 43/16* (2006.01)
*B65G 5/00* (2006.01)
*E21B 41/00* (2006.01)

(52) U.S. Cl.
CPC ............ *B65G 5/00* (2013.01); *E21B 41/0064* (2013.01); *Y02C 10/14* (2013.01)

(58) Field of Classification Search
CPC ........... Y02C 10/14; B65G 5/00; B65G 5/005
See application file for complete search history.

(56) References Cited

U.S. PATENT DOCUMENTS

| | | | |
|---|---|---|---|
| 2011/0056373 A1* | 3/2011 | Baxter | B01D 53/62 95/213 |
| 2013/0259575 A1* | 10/2013 | Hoier | E21B 41/0064 405/129.35 |
| 2014/0186119 A1* | 7/2014 | Dusseault | E21B 41/0064 405/129.2 |

* cited by examiner

*Primary Examiner* — John Kreck
(74) *Attorney, Agent, or Firm* — Daniel J. Jenkins

(57) ABSTRACT

A method for geo-sequestration of a carbon dioxide includes selection of a target water-laden geological formation with low-permeability interbeds, providing an injection well into the formation and injecting supercritical carbon dioxide ($SC-CO_2$) and water or bine into the injection well under conditions of temperature, pressure and density selected to cause the fluid to enter the formation and splinter and/or form immobilized ganglia within the formation.

5 Claims, 6 Drawing Sheets

METHOD FOR CARBON DIOXIDE SEQUESTRATION

RELATED APPLICATIONS

This invention is a continuation of and claims the benefit of U.S. patent application Ser. No. 13/951,036 filed on Jul. 25, 2013, entitled "Method for Carbon Dioxide Sequestration," which claims priority to U.S. Provisional Patent Application No. 61/675,677 filed on Jul. 25, 2012, entitled "Ganglion Dynamics and its Implications to Geologic Carbon Dioxide Storage", the contents of which are herein incorporated by reference in their entireties.

GOVERNMENT RIGHTS

The Government has rights to this invention pursuant to Contract No. DE-AC04-94AL85000 awarded by the U.S. Department of Energy.

FIELD

The invention relates generally to a method of sequestering carbon dioxide in a geologic formation, and more particularly to immobilizing injected supercritical $CO_2$ (SC-$CO_2$) by forming sc$CO_2$ ganglia in the formation through viscous instability by injecting water or brine with the sc$CO_2$.

BACKGROUND OF THE INVENTION

Human activities have an impact upon the levels of greenhouse gases in the atmosphere, which in turn is believed to affect the world's climate. Changes in atmospheric concentrations of greenhouse gases have the effect of altering the energy balance of the climate system and increases in anthropogenic greenhouse gas concentrations are likely to have caused most of the increases in global average temperatures since the mid-20th century. Earth's most abundant greenhouse gases include carbon dioxide, methane, nitrous oxide, ozone and chlorofluorocarbons. The most abundantly-produced of these by human industrial activity is $CO_2$.

Various strategies have been conceived for permanent storage of $CO_2$. These strategies include sequestration of gases in various deep geological formations (including saline aquifers and exhausted gas fields), liquid storage in the ocean, and solid storage by reaction of $CO_2$ with metal oxides to produce stable carbonates.

The most promising of these strategies is sequestration in geological formations. In these strategies, $CO_2$, generally in supercritical (SC) form, is injected directly into underground geological formations. Oil fields, gas fields, saline aquifers, un-minable coal seams, and saline-filled basalt formations have been suggested as storage sites. Various physical (e.g., highly impermeable cap-rock), solubility and geochemical trapping mechanisms are generally expected to prevent the $CO_2$ from escaping to the surface. Geo-sequestration can also be performed for other suitable gases.

Saline aquifers contain highly mineralized brines, and have so far been considered of little benefit to humans. Saline aquifers have been used for storage of chemical waste in a few cases, and attempts have been made to use such aquifers to sequester $CO_2$. The main advantage of saline aquifers is their large potential storage volume and their common occurrence. One disadvantage of any practical use of saline aquifers for this purpose is that relatively little is known about them. Leakage of $CO_2$ back into the atmosphere has been considered a potential problem in saline aquifer storage.

The densest concentration of $CO_2$ that can be placed in a porous formation such as a saline aquifer is when $CO_2$ is in a supercritical state—referred to herein as SC-$CO_2$. Most sequestration schemes are based on injection of SC-$CO_2$ in this supercritical state when the material behaves as a relatively dense compressible liquid with an extremely low viscosity, far lower than any formation liquid. The object is to displace most or all of the water in the saline aquifer, replacing 100% or some fraction of the porosity with SC-$CO_2$.

Injection of gaseous $CO_2$ (i.e. not in supercritical form) into a subsurface formation in solution with water at the maximum solubility limit is another approach to sequestration of this gas that has been proposed with mixed success in the past. Prior to the present invention, a problem of sequestering of $CO_2$ by dissolution in an aqueous solution within geological formations has been that the porous volume of the formation is occupied far less efficiently than the occupation which occurs upon injection of SC-$CO_2$. Once the active injection phase is completed, there is no more active mixing within the porous medium. Thereafter, the dissolution of the $CO_2$ within the formation water is controlled by the concentration differences, the contact area, and the diffusion path length. Mass transfer rates associated with such concentration gradient-driven diffusion processes in porous media are slow and it is expected that thousands of years may be required to approach full dissolution of the $CO_2$ in the aqueous phase within the geological formation.

The "reduced-mixing, long-term concentration gradient diffusion" problem persists even with injection of SC-$CO_2$. At the high injection rates proposed for SC-$CO_2$ sequestration, the SC-$CO_2$ will first displace water and occupy the pore space directly, with only a small amount of convective and dispersive-occurring mixing at the displacement fronts. As SC-$CO_2$ is injected over time, a growing area of contact is generated between the two fluids and a dissolution zone is generated. The SC-$CO_2$ then becomes dissolved into the saline water along this contact area, largely as the result of diffusion and dispersion associated with forced advection caused by pressure driven flow (from injection of the SC-$CO_2$ under pressure).

Because of the density difference between saline water and SC-$CO_2$, there are also gravitational forces that will tend to segregate the liquids in the saline aquifer: the SC-CO2 will rise above the denser water, forming a "pancake" under zones that are finer-grained with poorer permeability (shale streaks, siltstones, etc.). This not only suppresses part of the mixing component that would arise in a more uniform displacement, it also leads to a significant inefficiency in the access to the pore volumes in the formation: portions of the formation remote from the injection point are largely inaccessible to any storage mechanism (displacement by or dissolving of $CO_2$ into solution).

Once the injection ceases, only a small fraction of the SC-$CO_2$ has gone into solution because of the mixing and diffusive effects at the displacement fronts, and because the advective driving force (injection pressure) ceases. The $CO_2$ can no longer be advectively mixed with the water, and this leaves only diffusion effects that are driven solely by concentration gradients of $CO_2$ in the water.

In a saline aquifer formation, after injection, the SC-$CO_2$ remains high in the zone above the injection site due to its lesser density. This density-graded system provides a stabilizing force that further reduces the rate of any diffusion process. Initially, the diffusion front is relatively narrow and distinct with large surface area between the $CO_2$ and water and the solution process happens relatively efficiently. But over time this front grows and widens vertically. As a result, the front becomes less distinct. This produces a thicker diffusion or transition zone with less surface area between the $CO_2$ and water that has a low $CO_2$ concentration (i.e. the transition-dissolution-contact area between the SC-$CO_2$ and the formation water becomes enriched with $CO_2$. The vertical distance between water from remote regions of the formation and SC-$CO_2$ grows as $CO_2$-unsaturated water is further away from the SC-$CO_2$. Hence the diffusion/solution process slows considerably. As a result it can take many thousands of years for $CO_2$ to enter into solution, since in situ movement of water at remote regions of the formation (to facilitate the $CO_2$ in solution with water process) is very slow. At this stage, there is no convective mixing between the SC-$CO_2$ and the formation water due to the density graded system.

These prior strategies require that the geologic formation include a high integrity cap rock to prevent the escape and limit the movement of the injected $CO_2$ or SC-$CO_2$. Residual trapping of a non-wetting liquid phase in a brine reservoir may be an important mechanism for long-term CSS. Residual trapping can potentially relax stringent requirements for the integrity of cap rocks and allow utilization of open or dipping structures for carbon storage.

At this time, a method for immobilizing $CO_2$ in geologic formations having questionable cap rock integrity and/or in an open or dipping geologic formation for hundreds to millions of years has not been developed.

A need remains, therefore, for a method to immobilize $CO_2$ in geologic formations having questionable cap rock integrity and/or in an open or dipping geologic formation for hundreds to millions of years.

SUMMARY OF THE INVENTION

An embodiment of the present disclosure is directed to a method for predicting the movement of supercritical-carbon dioxide injected into a geologic formation. The method includes characterizing the geologic formation; determining the surface tension between fluid of the geologic site and supercritical carbon dioxide; determining supercritical carbon dioxide ganglion size for entrapment for a given fluid velocity; determining the maximum supercritical carbon dioxide ganglion formation by induced viscous interface instability; and determining the travel distance of supercritical carbon dioxide ganglion within the geologic formation based on entrapment criteria.

Another embodiment of the present disclosure is directed to a method for storing a carbon dioxide in a geologic formation. The method includes injecting supercritical carbon dioxide and a fluid into the geologic formation.

Another embodiment of the present disclosure is directed to a method of predicting risk of release of CO2 from CO2 geologic formation storage. The method includes characterizing the geologic formation; determining the surface tension between fluid of the geologic site and supercritical carbon dioxide; determining supercritical carbon dioxide ganglion size for entrapment for a given fluid velocity; determining the maximum supercritical carbon dioxide ganglion formation by induced viscous interface instability; determining the travel distance of supercritical carbon dioxide ganglion within the geologic formation based on entrapment criteria: and determining the risk based on supercritical carbon dioxide ganglion entrapment criteria.

DETAILED DESCRIPTION OF THE INVENTION

Figure 1:
FIG. 1 shows a thin section of Mount Simon Sandstone showing a typical sandstone pore structure (the horizontal field of view is 1.76 mm on the original specimen).

The present disclosure is directed to a method of sequestering or storing $CO_2$ in a geologic formation. The $CO_2$ injected by the disclosed method creates ganglia or small pockets of $CO_2$ that are immobilized by capillary tapping. Capillary trapping of $CO_2$ and SC-$CO_2$ significantly expands storage capacity through efficient utilization of subsurface reservoirs. The disclosed mechanism relaxes the need for stringent requirements for the integrity of cap rocks for $CO_2$ storage and therefore can significantly enhance storage capacity and security.

The present disclosure is further directed to a method that uses ganglion dynamics to predict the capillary trapping of supercritical CO2 (SC-$CO_2$) under relevant reservoir conditions. The disclosed method injects SC-CO$_2$ under conditions that break the injected SC-CO$_2$ into small disconnected ganglia, which enhances the efficiency of capillary trapping since the mobility of a ganglion is inversely dependent on its size. SC-CO$_2$ ganglia can be engineered by promoting CO$_2$-water interface instability during immiscible displacement, and their size distribution can be controlled by an injection mode utilizing water-alternating-gas and/or gas/fluid mixtures and rate. The disclosed method can also be used to break large mobile ganglion into smaller ganglia due to CO$_2$-brine interface instability during buoyant rise, thus becoming less mobile. The mobility of SC-CO$_2$ in the subsurface is therefore self-limited. Vertical structural heterogeneity within a reservoir can inhibit the buoyant rise of SC-CO$_2$ ganglia. The dynamics of SC-CO$_2$ ganglia described here provides a new perspective for the security and monitoring of subsurface CO$_2$ storage.

According to an embodiment of the disclosure, a method utilizing a model is disclosed that uses the theory of ganglion dynamics to predict the mobility of SC-CO$_2$ injected into a water-wet subsurface porous medium. The porous medium may be a sandstone reservoir. According to this embodiment, it can be predicted that the entrapment of SC-CO$_2$ ganglia in subsurface environments is improved by breaking up the injected SC-CO$_2$ into small blobs that enhance capillary entrapment.

The model assumes that the flow of both SC-CO2 inside a ganglion and water outside follows Darcy's law:

$$\vec{V}_s = -\frac{k}{\mu_s}\vec{\nabla}(P_s + \rho_s gz) \quad (1)$$

$$\vec{V}_w = -\frac{k}{\mu_w}\vec{\nabla}(P_w + \rho_w gz) \quad (2)$$

$$\vec{\nabla}\cdot\vec{V}_s = \vec{\nabla}\cdot\vec{V}_w = 0 \quad (3)$$

where $\vec{V}_s$ and $\vec{V}_w$ are the velocity fields of SC-CO$_2$ and water, respectively; k is the permeability of the porous medium; $\mu_s$ and $\mu_w$ are the viscosity of SC-CO$_2$ and water, respectively; $\rho_s$ and $\rho_w$ are the density of SC-CO$_2$ and water, respectively; g is the gravitation acceleration; $P_s$ and $P_w$ are the pressures of SC-CO$_2$ and water, respectively; and z is the vertical coordinate pointing upward.

At the macroscopic scCO2-water interface:

$$\vec{V}_s\cdot\vec{n} = \vec{V}_w\cdot\vec{n} \quad (4)$$

$$P_s - P_w = \sigma^*\vec{\nabla}\cdot\vec{n} + P_c \quad (5)$$

$$P_c = \begin{cases} \dfrac{2\sigma\cos(\theta)}{r_n} & \text{at an advancing front} \\ \dfrac{2\sigma\cos(\theta)}{r_p} & \text{at a receding front} \end{cases} \quad (6)$$

where $\vec{n}$ is the normal unit vector of the macroscopic ganglion surface pointing from SC-CO$_2$ to water; $\sigma$ is the pore-scale surface tension between SC-CO$_2$ and water; $P_c$ is the pore-scale capillary pressure; $\theta$ is the contact angle between the SC-CO$_2$-water interface and the underlying solid surface; $r_n$ and $r_p$ are the effective radii of pore throat and pore body, respectively; and $\sigma^*$ is the effective macroscopic surface tension between SC-CO$_2$ and water—an empirical parameter to capture the effect of surface tension on the stability of macroscopic SC-CO$_2$-water interface.

FIG. 1 illustrates a typical pore structure in sandstone. As can be seen in FIG. 1, the pore structure is characterized by the sizes of pore body and pore throat. Sandstone grains 10 are surrounded by pore space 20. The non-wetting SC-CO$_2$ phase tends to occupy large pore spaces as much as possible to minimize interfacial energy. A ganglion of SC-CO2 occupies multiple pores. A movement of a ganglion needs to overcome the capillary pressure difference between the advancing the receding fronts.

Figure 2:
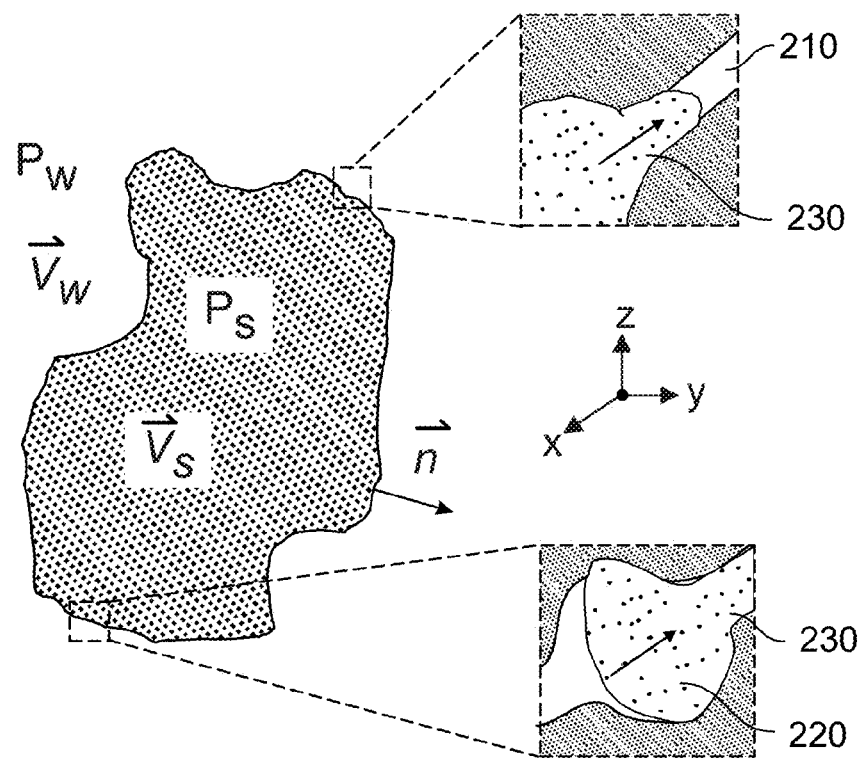
FIG. 2 is an illustration of a conceptual model of pore structure and ganglion movement with pore-scale ganglion movement at advancing and receding fronts.

FIG. 2 illustrates the inverse relationship between capillary pressure and radius of pore throat at the advancing front and capillary pressure and radius of pore body at the receding front as captured in equation (6). For simplicity, it is assumed that both advancing and receding contact angles are similar. Parameter $\sigma^*$ is scale-dependent and can be related to $\sigma$ by accounting for surface roughness:

$$\sigma^* = C\sigma^*C\sigma \quad (7)$$

with C=b(d)$^{1-D}$, where b is the fractal coefficient, d is the microscopic investigation scale, and D is the fractal dimension of the interface. It is assumed that both water and SC-CO$_2$ are non-compressible (Eq. 3). Equation (4) imposes velocity continuity across the interface for the normal component. Equation (5) accounts for the pressure drop across the macroscopic SC-CO$_2$-water interface[22], including both the effect of macro-scale surface tension $\sigma^*$, which tends to minimize the macroscopic surface area of a ganglion, and the effect of pore-scale capillarity, which tends to impede a scCO$_2$ blob snapping through pore throats.

Let F(x,y,z,t)=0 denote the macroscopic surface of a ganglion. The motion of the surface is related to the flow field by a kinematic equation:

$$\vec{V}_s\cdot\vec{\nabla}F + \frac{\partial F}{\partial t} = 0 \quad (8)$$

where t is the time. The normal unit vector $\vec{n}$ can then be calculated by:

$$\vec{n} = \frac{\vec{\nabla}F}{|\vec{\nabla}F|} \quad (9)$$

Equations 1-9 constitute a moving boundary problem for the evolution of a scCO$_2$ ganglion in a porous medium. With appropriate boundary and initial conditions, this set of equations can be solved for the motion and morphological evolution ($\vec{V}_s$, F) of a single ganglion or multiple ganglia.

By integrating equation (5) for the force acting over the surface of a moving ganglion, using Stokes's theorem, we obtain:

$$\oiint(\sigma^*\vec{\nabla}\cdot\vec{n} + P_c)d\vec{S} = \oiint(P_s - P_w)d\vec{S} = \iiint\vec{\nabla}\cdot(P_s - P_w)dV = \Delta\rho gV\vec{z} + \iiint\left(\frac{\mu_w}{k}\vec{V}_w - \frac{\mu_s}{k}\vec{V}_s\right)dV \quad (10)$$

where $\Delta\rho = \rho_w - \rho_s$; V is the volume of the ganglion; $\vec{z}$ is the vertical unit vector; and S is the surface area of the ganglion. The first term on the far right hand side represents the buoyancy force due to the density difference between water and scCO$_2$; the second and third terms, within the integral, account for the force exerted by groundwater pressure gradient (it is assumed that the flow field of water can be extended to the inside of the ganglion) and for the resistance which the ganglion has to overcome in order to move through the porous medium. An exact evaluation of equation (10) would require a full solution of equations (1-9) for the flow fields. For simplicity, we make the following approximations:

$$\oiint (\sigma^* \vec{\nabla} \cdot \vec{n} + P_c) dS \approx \Delta \rho g V \vec{z} + \left( \frac{\mu_w}{k} \vec{V}_w^0 - \frac{\mu_s f \mu_w}{k} \vec{V}_s^g \right) V \quad (11)$$

where $\vec{V}_w^0$ is the average velocity of groundwater flow around the ganglion; and $\vec{V}_s^g$ is the velocity of ganglion movement as a whole. During movement, water will be displaced around the ganglion, moving from its advancing front to its tail at the same speed as the ganglion is advancing. This effect is captured by an effective viscosity $\mu_s + f \mu_w$ in equation (11), where f is the ratio of the travel distance of water to the distance of ganglion movement. Since the water moves around the ganglion surface, f is expected to be slightly larger than 1. As a first order approximation, we set f equal to 1.

Let $\vec{V}$ denote the unit vector of net driving force for ganglion movement $$\left( \Delta \rho g V \vec{z} + \frac{\mu_w}{k} V \vec{V}_w^0 \right).$$

By setting $\vec{V}_s^g$ to zero, from equation (11), the entrapment criterion for a ganglion is described by:

$$\left\| \Delta \rho g V \vec{z} + \frac{\mu_w}{k} V \vec{V}_w^0 \right\| \leq \oiint (\sigma^* \vec{\nabla} \cdot \vec{n} + P_c) \vec{l} \cdot d\vec{S} \quad (12)$$

where $\vec{V} \cdot d\vec{V} \geq 0$ indicates an advancing front, and $\vec{V} \cdot d\vec{V} < 0$ indicates a receding front. The left hand side of the equation represents the total driving force contributed both by buoyancy and water flow, while the right hand side is the total impedance that needs to be overcome for a ganglion to be mobilized. For a no-flow (buoyancy-only) case, the trapping criterion becomes:

$$\Delta \rho g V \vec{z} \leq \oiint (\sigma^* \vec{\nabla} \cdot \vec{n} + P_c) \vec{z} \cdot d\vec{S} \quad (13)$$

Equation (12) indicates that capillary trapping of a SC-CO$_2$ ganglion is controlled by the pore-scale capillarity, the macro-scale surface tension, the geometry of the ganglion, and the water flow field. Generally, the curvature of a macroscopic water-SC-CO$_2$ interface is much smaller than that of the pore-scale interface. Thus, the first term in the integral in both equation (12) and (13) may be negligible compared to the second term, although it may play an important role in the morphological instability of a ganglion.

First order approximation may be used to simplify the equations, in which a ganglion with a simple geometry is considered and the motion of an individual ganglion is separated from its morphological instability. With the simple ganglion geometry considered below, the integration of term $(\sigma^* \vec{\nabla} \cdot \vec{n})$ in Equations (12) and (13) vanishes. The parameter values used for these model analyses are summarized in Table 1.

TABLE 1

List of parameter values used in the model analyses

| Parameter | Value used in model analyses | Possible range | Sources |
|---|---|---|---|
| Microscopic surface tension of water-scCO$_2$ interface ($\sigma$) | 0.04 N/m | 0.035-0.05 N/m (pressure 8-17 MPa, temperature = 40-60° C.) | Refs. 35 and 36 |
| Scaling factor for apparent surface tension (C) | 3 | 2-4 | Ref. 21 |
| Viscosity of aqueous solution ($\mu_w$) | 7.5 × 10$^{-4}$ N·s/m$^2$ | 0.4-1.0 × 10$^{-3}$ N s/m$^2$ | Ref. 9 |
| Viscosity of scCO$_2$ ($\mu_s$) | 4.0 × 10$^{-5}$ N s/m$^2$ | 3.7-5.2 × 10$^{-5}$ N s/m$^2$ (reservoir depth = 800-2000 m, thermal gradient = 3° C./100 m) | Ref. 9 |
| Permeability (k) | 10$^{-10}$ m$^2$ | 10$^{-12}$-10$^{-10}$ m$^2$ | Ref. 9 |
| Contact angle between the water-scCO$_2$ interface and the underlying solid surface ($\theta$) | 40° | 10-65° (pressure = 26.6-48.9 MPa, temperature = 354.5 K) | Refs. 24 and 25 |
| Density of scCO$_2$ ($\rho_s$) | 650 kg/m$^3$ | 500-700 kg/m$^3$ for a storage depth of 0.8-2 km with a geothermal gradient of 3° C. per 100 meters) | Refs. 37 & 38 |
| Density of aqueous solution ($\rho_w$) | 1,065 kg/m$^3$ | 1,000-1,150 kg/m$^3$ | Ref. 39 |
| Gravitational acceleration (g) | 9.8 m/s$^2$ | | |

Capillary Trapping of SC-CO$_2$ Ganglia in the Absence of Water Flow may be approximated. For simplicity, a vertical, cylindrical SC-CO$_2$ ganglion with a height of H is considered. From equation (13), the entrapment condition for the ganglion is described by:

$$H < H_c = \frac{2\sigma \cos(\theta)}{\Delta \rho g}\left(\frac{1}{r_n} - \frac{1}{r_p}\right) \quad (14)$$

where H$_c$ is the critical value of H. The contact angle between the SC-CO$_2$-water interface and the underlying mineral surface is an important factor controlling the effectiveness of capillary trapping. With increasing the contact angle, the trapping efficiency decreases, especially when the angle approaches 90 degrees. The contact angle on a porous aluminum silicate substrate in SC-CO$_2$ was assumed to be 10 to 40 degrees, depending on the confining pressure. The contact angle is given to be 20 to 35° for quartz and 20 to 65° for mica. One complication with contact angle measurements is that this parameter is sensitive to surface roughness, and its determination for actual geologic materials can be challenging.

FIG. 2 illustrates a pore throat 210 and pore body 220 in which a ganglion 230 has been trapped. The critical vertical dimension (H$_c$) of a SC-CO$_2$ ganglion that can be trapped is inversely proportional to the pore diameter, for three different contact angles and at a fixed size ratio of pore to pore throat. In absence of groundwater flow, for typical sandstone with a pore diameter from 0.6 to 2 mm, capillarity alone can trap a ganglion with a vertical dimension of 3 to 30 cm.

The effect of reservoir heterogeneity can then be explored by using Equation (14) to understand the effect of vertical heterogeneity within a reservoir rock on SC-CO$_2$ entrapment. Consider a horizontal less permeable layer (e.g. siltstone) within a permeable sandstone formation. Assume that a SC-CO$_2$ ganglion is trapped just beneath the finer-grained interbed rock. In this case, in order to move upward, the ganglion has to snap through the pore throats in the interbed at its advancing front, while retreating from the pore bodies in the sandstone at its receding front. In other words, the parameter r$_n$ in equation (14) now refers to the throat diameter of the interbed, while the parameter r$_p$ remains to be the pore size of the sandstone.

Figure 3:
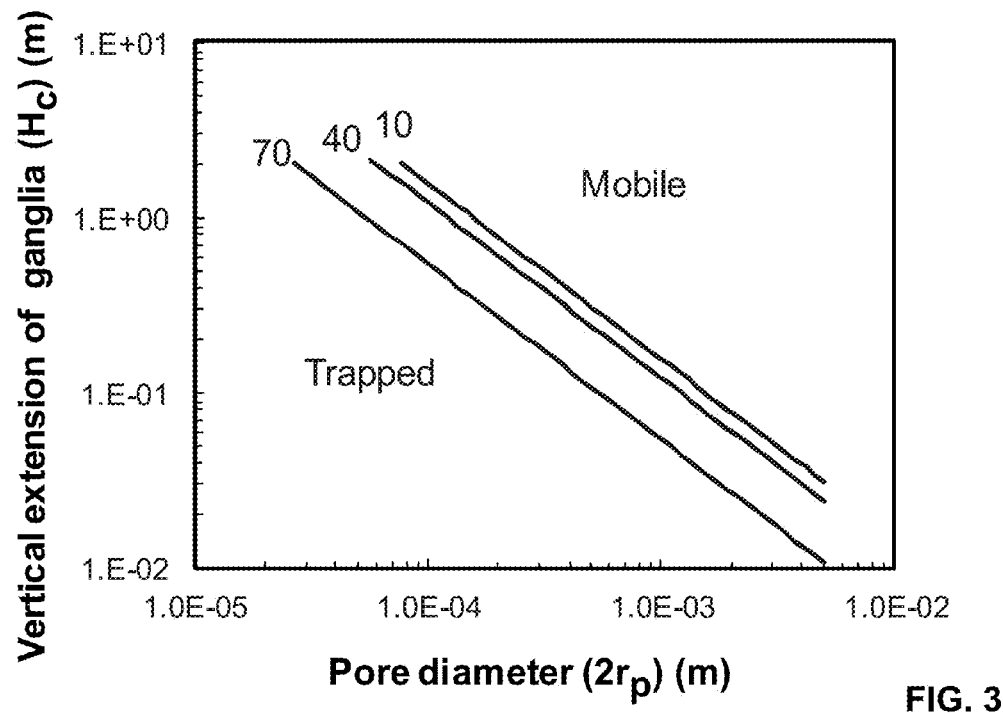
FIG. 3 shows a graph showing the relationship for critical vertical dimension for the entrapment of a SC-$CO_2$ ganglion as a function of pore diameter and contact angle (10°, 40°, and 70°) for a buoyance-only case. The size ratio of pore to throat is set to 5:1.

FIG. 3 shows how the pore size (or particle size) of the interbed affects the critical size of a SC-CO$_2$ ganglion for trapping, assuming the same pore/throat size ratio for both the sandstone and the interbed. The maximum vertical dimension of the ganglion that an interbed can effectively immobilize is a direct function of the size of its pores and the size of the pores of the underlying host formation. For example, for a shale cap rock, capillarity alone can inhibit upward movement of a ~50 meter thick layer of SC-CO$_2$. A siltstone layer, with a grain size 10 times smaller than that of the sandstone, can effectively cap SC-CO$_2$ ganglia (or banks) with vertical dimensions up to 3 m. A siltstone layer with a grain size 3 times smaller is enough to trap all ganglia with vertical dimensions up to 1 m. Therefore, the vertical heterogeneity of the reservoir formation is an important factor for enhancing SC-CO$_2$ entrapment. Numerical simulations indicate that trapping by finer-grained interbeds may account for up to ~35% of the total CO$_2$ immobilized. Interbeds here are referred to thin, less continuous layers with smaller particle sizes. The effectiveness of this mechanism has been demonstrated experimentally. In a CO$_2$ flooding column experiment, it was found that a thin layer of reduced porosity at the exiting end of the column greatly increases (by a factor of 2-5 times) the residual CO$_2$ trapping in the core.

In principle, SC-CO$_2$ ganglia can form through interface instability during immiscible displacement. In SC-CO$_2$ injection, the non-wetting CO$_2$ phase displaces the preexisting wetting phase (pore water). The morphologic instability of the displacement front is described by equations 1-9. A stability analysis of equations 1-9 can be analyzed for when a planar interface between the two immiscible liquids advances at a constant velocity (V$_s$), instability occurs when v$_s$ exceeds a critical value V$_{s,c}$ given by:

$$V_{s,c} = -\frac{\Delta \rho g k \cos(\alpha)}{\mu_w - \mu_s} \quad (15)$$

where α is the angle between the vertical axis pointing upward and the normal direction to the interface pointing from SC-CO$_2$ to water. V$_{s,c}$ can be either positive or negative depending on the interface orientation. An unstable front would then become fingered, and the finger spacing λ is determined by:

$$\lambda = 2\sqrt{3}\,\pi \left[\frac{k\sigma^*}{(\mu_w - \mu_s)(V_s - V_{s,c})}\right]^{1/2} \quad (16)$$

Finger spacing predicted with Equation (16) has been shown to agree well with numerical simulations.

Figure 4:
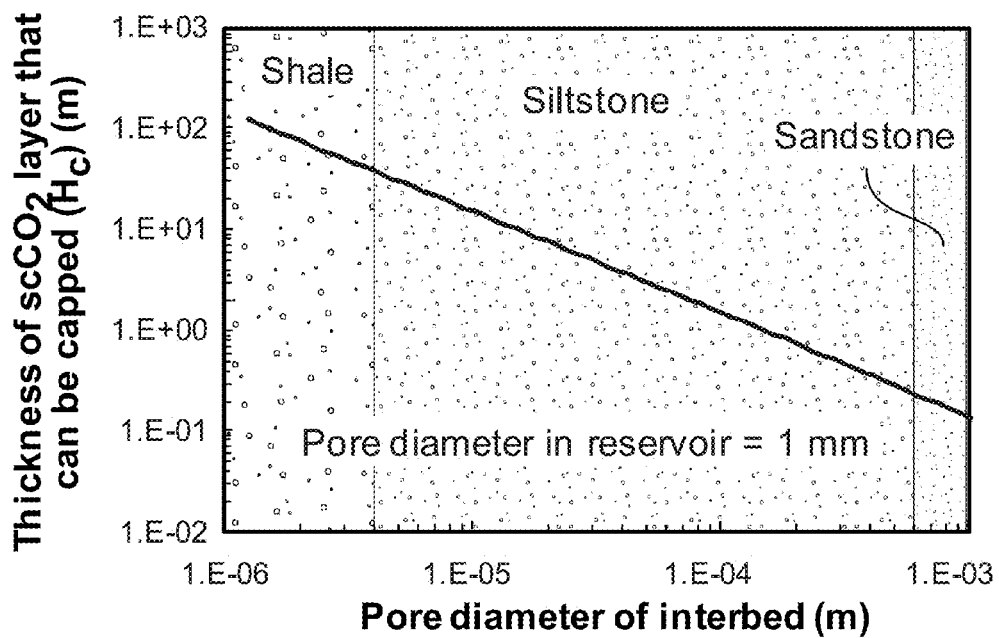
FIG. 4 is a graph showing the effect of the pore size of an interbed on SC-$CO_2$ trapping. The ratio of pore diameter to throat diameter is 5:1 for both sandstone and interbed.

Now consider a case in which SC-CO$_2$ is injected to into a horizontal sandstone reservoir. The initial interface between CO$_2$ and preexisting brine is vertically aligned (i.e., α=90°). The finger spacing for the front can be calculated as a function of the velocity of the moving front and the permeability of the reservoir (FIG. 4). Finger spacing decreases with both increasing injection rate and decreasing permeability. For reasonable CO$_2$ injection rates, the CO$_2$-water interface becomes unstable, and the resulting finger spacing ranges from 1 cm to 30 cm. Alternating the injection of CO$_2$ with water should cut the fingers horizontally, thus facilitating the formation of isolated ganglia.

Moving ganglia may be understood by considering a vertical cylindrical scCO$_2$ ganglion in the absence of groundwater flow. From equation (11), the velocity of ganglion rise can be estimated by:

$$V_s^g \approx \frac{k}{\mu_w + \mu_s}\left[\Delta \rho g - \frac{2\sigma \cos(\theta)}{H}\left(\frac{1}{r_n} - \frac{1}{r_p}\right)\right] \quad (17)$$

Figure 5:
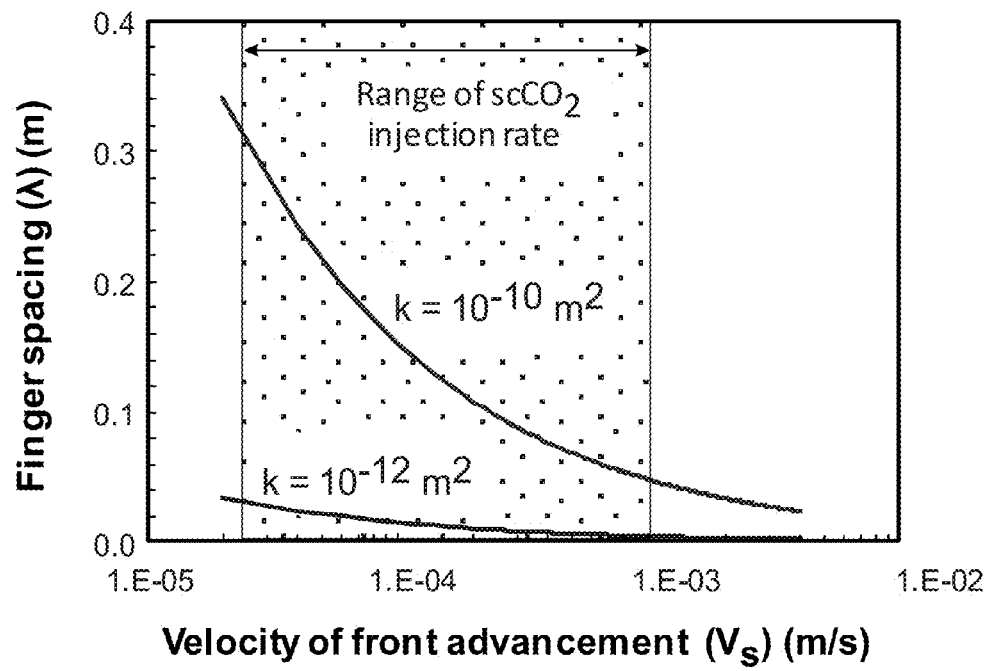
FIG. 5 is graph showing the finger spacing induced as SC-$CO_2$ displaces pore water during $CO_2$ injection, for two different reservoir permeabilities. The shaded area indicates the possible range of front velocities, assuming a typical $CO_2$ injection rate of $10^4$ to $10^6$ metric tons per year in a borehole of 0.3 m diameter and with 10 m injection interval. Finger spacing here is equivalent to the vertical dimension of a ganglion in FIG. 3.

In FIG. 5, the velocity of ganglion rise is calculated as a function of the vertical dimension (H) of the ganglion. A sufficiently large ganglion will rise, and its velocity will increase with its size. Because of interfacial instability, as described in the previous section, a large ganglion may experience further fingering at its advancing front and break into smaller pieces, causing further trapping.

A ganglion may grow as it moves due to coalescence with other ganglia in the pathway. However, once it becomes large enough, the ganglion will break up through interface instability. This breaking and trapping mechanism thus imposes an important limit on ganglion size evolution. In this sense, the mobility of a group of ganglia becomes self-limited. This concept points to a new way for making small ganglia for capillary trapping, that is, to inject SC-$CO_2$ into the bottom of the reservoir and then let it rise. As it rises, a $CO_2$ bank will automatically break up into small pieces. Based on a scaling analysis of equations (1-9), the travel distance required for this breakup is probably on the same magnitude as the original ganglion size. Note that the terms of "size" and "vertical extension" interchangeably, because we expect that the surface tension of a ganglion would tend to minimize the aspect ratio of the ganglion.

Figure 6:
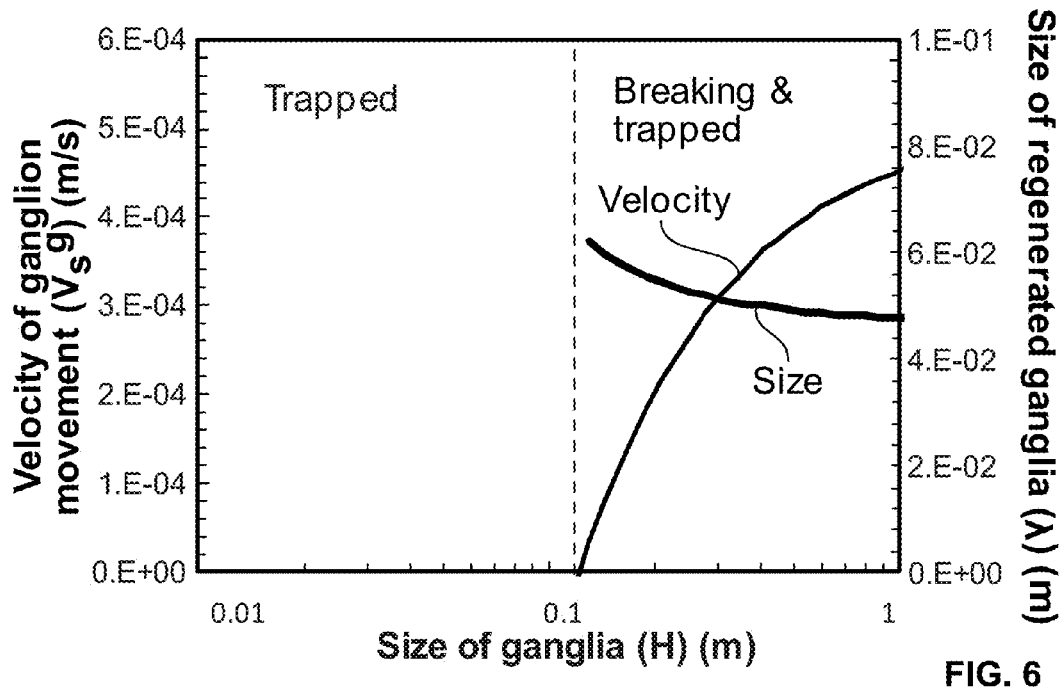
FIG. 6 shows ganglion breaking and trapping due to interface instability. The radii of pore throat and pore body are assumed to be 0.1 and 0.5 mm, respectively. To the left of the vertical broken line, ganglia are small and trapped. To the right, ganglia are large enough to attain sufficient rising velocities to cause further breaking up and trapping. The size of regenerated ganglia is calculated from equations (15) and (16) by setting $\alpha=0$, and thus SC-$CO_2$ fingering due to gravity instability is automatically accounted. Since the size of regenerated ganglia is smaller than the critical size (~0.1 m) for mobilization, all regenerated ganglia become trapped.

Now consider the mobilization of SC-$CO_2$ ganglia in a water flow field. As shown in FIG. 6 (solid line), the critical ganglion size for mobilization decreases with increasing water flow velocity. Once mobilized, a ganglion would be carried down along the water stream through entrainment. The velocity of a ganglion entrained depends on its size. Consider a horizontal cylindrical ganglion with its length of L and, for simplicity, ignore the buoyancy term in equation (11). From equation (11), the entrainment effect can be described by the velocity ratio of ganglion to the carrying fluid:

$$\frac{V_s^g}{V_w^0} = \frac{\mu_w}{\mu_w + \mu_s} - \frac{k}{\mu_w + \mu_s} \cdot \frac{2\sigma\cos(\theta)}{LV_W^0}\left(\frac{1}{r_n} - \frac{1}{r_p}\right) = \quad (18)$$

$$\frac{\mu_w}{\mu_w + \mu_s} - \frac{k}{1 + \mu_s/\mu_w} \cdot \frac{2}{LCa}\left(\frac{1}{r_n} - \frac{1}{r_p}\right)$$

where Ca [$=\mu_w V_w^0/\sigma \cos(\theta)$] is the capillary number. For a given size, a ganglion would be entrained only when the carrying flow velocity exceeds a critical value (the intercept of a dash line with the X-axis) (FIG. 6). It seems unlikely for a regional groundwater flow (say, with a flow rate <$10^{-5}$ m/s) to mobilize any injected SC-$CO_2$ once the SC-$CO_2$ phase is broken into small ganglia with a size less than 40 cm. During a $CO_2$ injection time period, however, due to high flow rates, SC-$CO_2$ ganglia may be carried away by water flows. In a given water flow field, a larger ganglion would move faster than a smaller one. As it moves, a large ganglion may grow by coalescence with other ganglia in the pathway, and may eventually break up due to interface instability. The movement of a ganglion can also potentially be affected by the presence of its neighboring ganglia, leading to a so-called crowding effect.

The model formulated above provides a unified framework to relate the capillary trapping of SC-$CO_2$ to key controlling factors such as ganglion size, surface tension, contact angle, rock pore structure, and the chemistry of phase interfaces. The model analyses demonstrate that capillary trapping can be an important mechanism for long-term geologic storage of $CO_2$. The analyses show that the movement of a SC-$CO_2$ ganglion is inversely dependent on its dimension: the smaller the ganglion, the more difficult it is to move. Therefore, breaking the injected supercritical $CO_2$ into small ganglia can significantly enhance the effectiveness of capillary trapping. A large, mobile ganglion can potentially break up into smaller, less mobile gangli through the instability of the $CO_2$-water interface during buoyant rise, and therefore the mobility of SC-$CO_2$ in the subsurface is self-limited. The SC-$CO_2$ ganglia can be made through deliberately engineered interface instability of immiscible flows, and their size distribution can be controlled by SC-$CO_2$ injection mode and rate.

Figure 7:
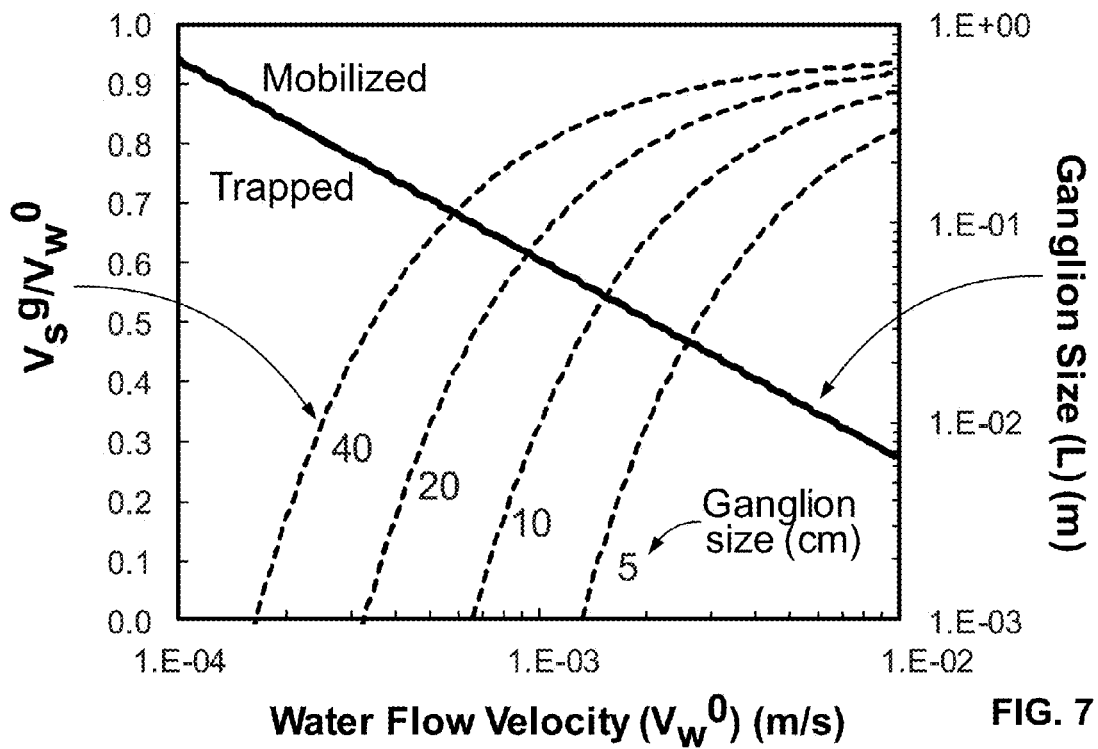
FIG. 7 is a graph showing mobilization and entrainment of ganglia by flow field. Larger ganglia would be more easily mobilized and move faster than the smaller ones in a given flow field. The radii of pore throat and pore body are assumed to be 0.1 and 0.5 mm, respectively.

Ganglion dynamics presented above provides a new perspective for maximizing subsurface $CO_2$ trapping and safe storage. As shown in FIG. 4, a relatively homogeneous medium with a larger grain size (i.e. high permeability), which is favored for high reservoir injectivity, would result in larger sc$CO_2$ ganglia due to great permeability. However, larger pores and larger ganglia would reduce the effectiveness of capillary trapping, as indicated in FIG. 2. Therefore, there should be an optimal pore size for capillary trapping of SC-$CO_2$, balancing permeability and porosity (FIG. 7). The model also shows that the vertical structural heterogeneity of reservoir rock can greatly enhance $CO_2$ ganglion trapping (FIG. 3). Therefore, a sandstone formation with a medium grain size and significant vertical heterogeneity may constitute an ideal medium for capillary trapping of SC-$CO_2$.

The disclosed model presents a complex picture of population dynamics of SC-$CO_2$ ganglia in the subsurface. Percolation theory predicts that, near a percolation threshold in immiscible displacement, when the non-wetting liquid starts to become disconnected, the number (p) of ganglia of size L follows a power law:

$$p(L) \sim L^{-\tau} \quad (19)$$

where $\tau$ is a constant (=~2.0). This relationship has been confirmed by directly imaging the size distribution of gas bubbles co-injected with water into sandstone columns. As discussed above, a large ganglion can spontaneously break up during movement. The critical size estimated in FIGS. 2 and 5 thus impose an upper limit on the size distribution of SC-$CO_2$ ganglia. The actual distribution may follow a truncated power law. The capacity of a geologic medium for capillary trapping (CCT) can then be related to the key controlling factors by equation (20):

$$CT \propto \int_{r_p}^{H_c} p(L)dL = \frac{1}{r_p} - \frac{\Delta\rho g}{2\sigma\cos(\theta)} \frac{r_p r_n}{r_p - r_n}. \quad (20)$$

This relationship is qualitatively consistent with the measurements of residual saturation for SC-$CO_2$ and n-decane in brine-saturated Berea sandstone. The measurements show a systematically higher residual saturation for n-decane than that for SC-$CO_2$. Note that n-decane has a relatively smaller density difference ($\Delta\rho$) and higher surface tension ($\sigma$) than SC-$CO_2$.

The maximum capacity of capillary trapping can be estimated by assuming that it corresponds to the percolation threshold, at which the non-wetting phase just becomes disconnected. The percolation threshold depends on the shape and the size uniformity of ganglia. Based on a simple cubic lattice calculation, the threshold is estimated to be 0.341 for ganglia with a uniform size. This is consistent with a recent column experiment, which shows that the maximum residual supercritical $CO_2$ phase in Berea sandstone is about 35%. This seems reasonable, considering that the core sample used in this experiment is small (~4 cm in diameter and 8 cm in length) and, as a result, the size distribution of ganglia is limited to a relatively narrow range. In an actual reservoir, however, the size of ganglia is expected to distribute over a much broader range, and the actual capacity could be higher. As pointed out earlier, one advantage of capillary trapping is that this mechanism does not require a cap rock or the structural integrity of cap rock. Therefore, the total capacity of sequestration by capillary trapping on a regional scale could be significant.

As discussed above, the key parameters controlling capillary trapping of SC-$CO_2$ include: the surface tension, the contact angle, the density difference between SC-$CO_2$ and pore water, and the pore structure of the media. There are large uncertainties associated with each of these parameters. First, contact angles for many reservoir-relevant minerals are poorly known for the potential range of reservoir pressure, temperature, and chemical conditions. Furthermore, contact angles can potentially be modified by the presence and properties of water films on mineral surfaces. The thickness of water film is controlled by mineral surface properties and pore-water chemistry.

Surface tension between SC-$CO_2$ and aqueous solution can potentially be affected by solution chemistry and possible organic compound dissolution into either the supercritical phase or the aqueous solution, which may modify the interfacial properties between the two liquids. As indicated in equation (7), the macroscopic effective surface tension $\sigma^*$ is scale-dependent, which makes it difficult to characterize for an actual system. In general, chemical reactions will be enhanced by the formation of SC-$CO_2$ ganglia due to an increase in specific surface area of SC-$CO_2$. The key parameters identified here may then evolve with time. For example, dissolution of organics (e.g. oil residues) from mineral surfaces can change the wetting properties of the surface and therefore the liquid-mineral contact angle. Mineral dissolution and precipitation may change the pore structure of the storage media. For example, secondary mineral precipitation may enhance capillary trapping by reducing porosity or pore throat size specifically. As minerals dissolve and new minerals precipitate, the pore surface properties (e.g., surface roughness and chemical identity) will also change. Evaluating the importance of these effects on long-term $CO_2$ trapping is scientifically challenging.

The analysis presented here indicates that the size of SC-$CO_2$ ganglia may distribute over a wide range following a power law and the size of large ganglia may exceed the size of what is generally considered to be a representative element volume. More importantly, this disclosed methodology shows that the size of a ganglion is one of the most important factors controlling capillarity trapping of SC-$CO_2$ ganglia. None of the existing continuum models explicitly account for the important effect of ganglion size.

The ganglion concept developed above also provides a reasonable explanation for seemingly contradictory observations on residual gas saturation in a porous medium. With an X-ray computer tomography (CT) technique, Suekane et al. imaged the distribution of nitrogen gas bubbles in Berea and Tako sandstone in a core-flooding experiment. They found that, on a local scale (~1 mm), the residual gas saturation increases with an increase in porosity. However, on a core scale, the residual gas saturation exhibits an inverse relationship with porosity. These seemingly contradictory observations are actually the two different manifestations of the same immiscible displacement process. Based on the earlier discussions, a non-wetting fluid tends to occupy large pore spaces as much as possible to minimize gas-water interfacial energy. Therefore, on a scale close to pore size, the residual gas saturation should positively correlate with local porosity. However, on a bulk scale, because of the same tendency to minimize gas-water interfacial energy, smaller pores (actually smaller pore throats for this matter) would create more capillary resistance for gas bubbles to snap through pore necks, thus promoting residual trapping. Thus, on a core scale, the residual gas saturation should be inversely correlated with porosity (i.e., pore size), as indicated in equations (14) and (18).

Finally, the concept developed here allows for the development of a new technique for characterizing and monitoring SC-$CO_2$ in subsurface environments. For example, recent interest in using acoustic waves to enhance oil recovery has stimulated a significant amount of work on the interaction of acoustic waves with non-wetting oil blobs in porous media. It has been found that acoustic waves may induce capillary resonance of the blobs and the size of the blob (L) can be related to the resonant frequency ($\omega$) by:

$$L = \frac{16\sigma \sin(\theta)[1 + \sin(\theta)]^2}{\rho_s(r_n + r_p)^2 \omega^2} \tag{21}$$

As discussed above, supercritical $CO_2$ injected into a reservoir is likely to form discontinuous ganglia. It is reasonable to expect that acoustic wave attenuation at a specific wave frequency is mainly attributed to the capillary resonance of ganglia of the appropriate size. If this is true, then measuring the attenuation of acoustic waves at various frequencies may allow us to estimate the size distribution of SC-$CO_2$ ganglia in subsurface systems.

According to another embodiment of the disclosure, a method for storing $CO_2$ is disclosed. In this embodiment, SC-$CO_2$ is alternately injected with a fluid. The fluid may be brine, water, or other similar fluid.

Figure 8:
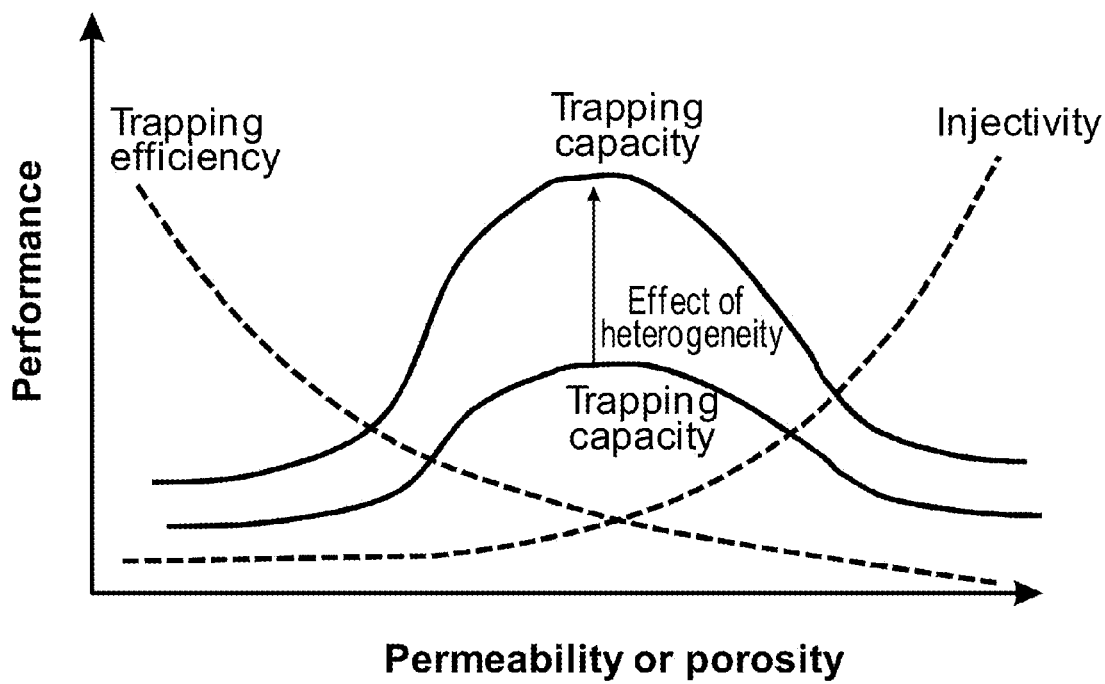
FIG. 8 is an illustration of the existence of an optimal condition for SC-$CO_2$ capillary trapping.
Figure 9:
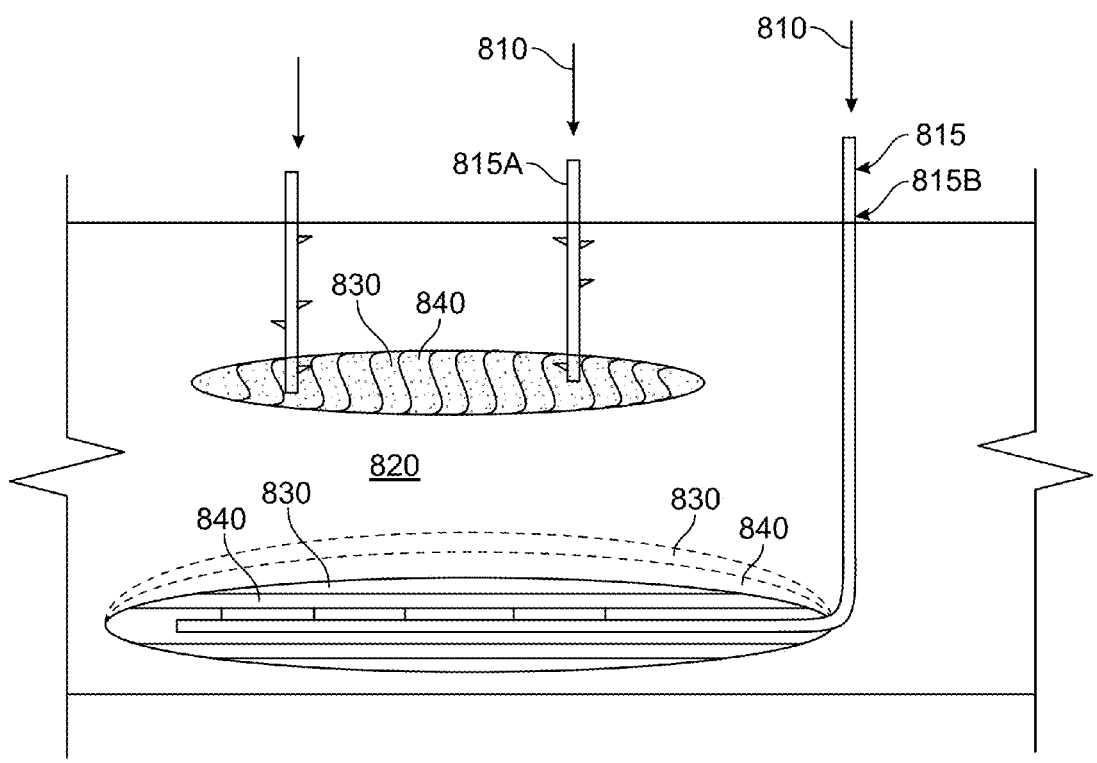
FIG. 9 is an illustration of an embodiment of an injection field according to the present disclosure.

FIG. 8 illustrates an exemplary embodiment of this process. As can be seen in FIG. 8, a fluid stream 810 is introduced into a well 815 and injected into a geologic formation 820. The well 815 may be a vertical well 815 A or a horizontal well 815B. In another embodiment, the well 815 may be oriented at any angle between vertical and horizontal. The geologic formation 820 may be sandstone or other porous rock layer. The geologic formation may or may not be covered or partially covered with a impervious cap rock such as shale.

The fluid stream 810 includes alternating amounts, zones or plugs of a liquid and SC-$CO_2$ to create horizontal spaced zones or plugs of SC-$CO_2$ 830 and fluid 840. The SC-$CO_2$ 830 may be mixed with another fluid before being introduced to the well, such as, but not limited to brine or water. The fluid 840 may be brine or water. The zones of SC-$CO_2$ 830 and fluid 840 may include zones of SC-$CO_2$ 830A and fluid 840B that have percolated upward.

In an embodiment, the width of the zones of SC-$CO_2$ 830 and fluid 840 are sufficient to move the previous zone within the formation 820. The width or thickness of the zones is the distance between the leading and trailing edge in the zone movement direction. The amount of SC-$CO_2$ 830 and fluid 840 sufficient to move the previously introduced zone within the formation 820, and is dependent upon the formation porosity and chemistry. As discussed above, the movement of the SC-$CO_2$ zones breaks up SC-$CO_2$ ganglia, reducing the size of the SC-$CO_2$ ganglia, thereby improving immobilization. In an embodiment, the thickness of the zones of SC-$CO_2$ 830 and fluid 840 are between 1 and 10 meters.

In another embodiment, the amount of SC-$CO_2$ 830 and/or fluid 840 is selected to allow the zones of SC-$CO_2$ 830 and fluid 840 to mix within the formation as they travel away from the well, the fluid 840 pushing the SC-$CO_2$ 830, breaking up the SC-$CO_2$ ganglia thereby improving immobilization. As understood by one in the art, the miscibility of SC-$CO_2$ 830 and fluid 840 is small and thus mixing, as understood in the light of this disclosure, is substantially forming a two phase mixture of SC-$CO_2$ 830 and fluid 840. In another embodiment, the SC-$CO_2$ 830 and fluid 840 are mixed to form a two phase mixture before being introduced into the well 815.

In another embodiment, the geologic formation 820 is characterized for its vertical variability of pore size and permeability using geophysical and petrographic methods. An optimal site for $CO_2$ sequestration would be the formation with significant vertical pore size/porosity variations (i.e. with interbeds) ranging from 4 µm to 1 mm.

In another embodiment, geophysical methods such acoustic waves and seismic waves can be used to detect or monitor the size distribution of SC-$CO_2$ ganglia during or after injection, as indicted by equation 21.

Figure 10:
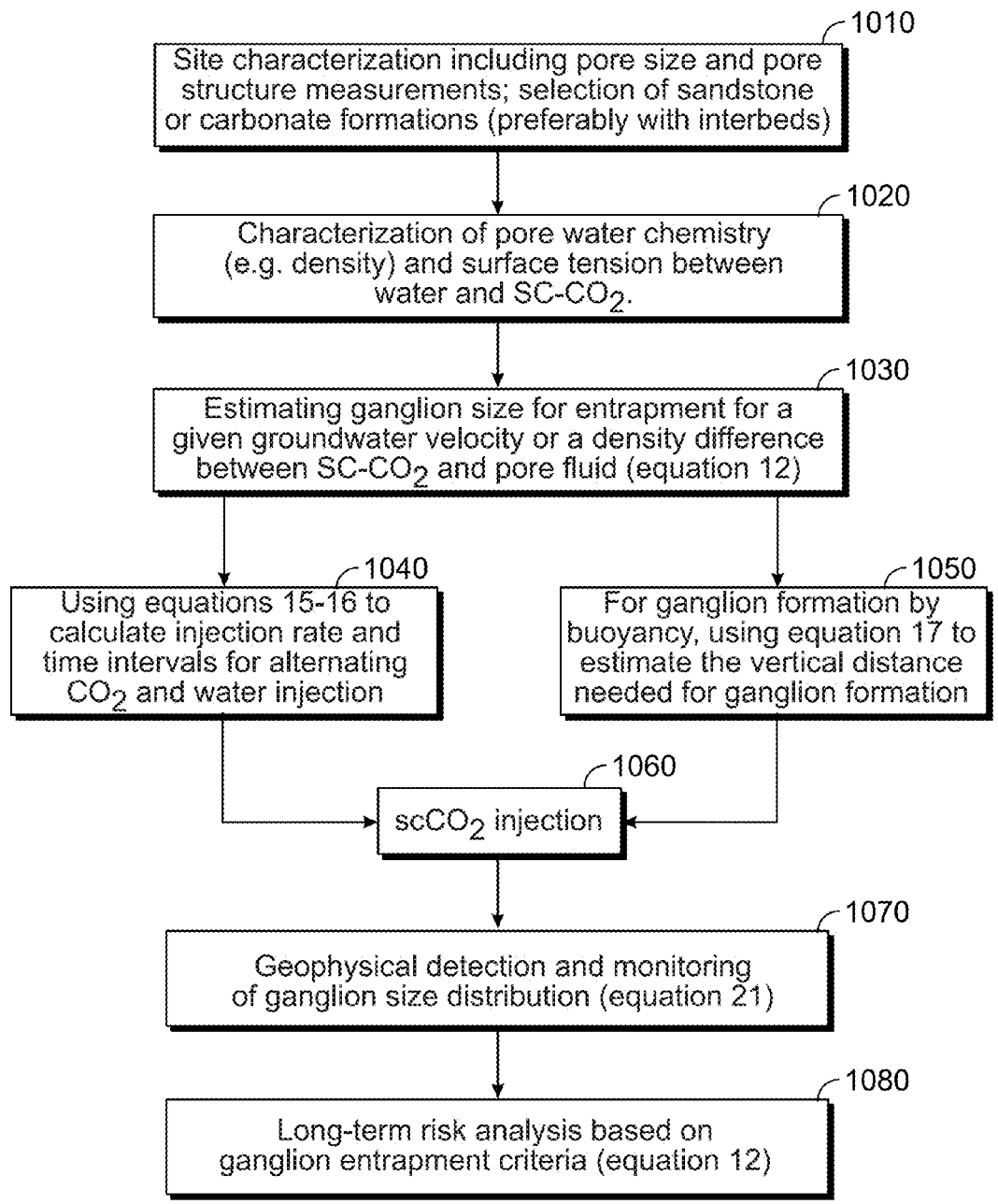
FIG. 10 is a flow chart of an exemplary embodiment of a method of predicting long term risk of storing $CO_2$ in a geologic formation according to the present invention.

FIG. 10 is a flow chart illustrating an exemplary embodiment of a method of predicting long term risk of storing $CO_2$ in a geologic formation according to the present invention. As can be seen in FIG. 10, step 1 (1010) is site characterization, which includes porosity, pore size, and pore structure, lithology (such as sandstone or carbonate formations) and interbed distribution within the host rock. Interbeds are thin, continuous or discontinuous sediment seams less permeable than the bulk rock formation.

Step 2 (1020) is pore-fluid chemistry, such as but not limited to density, pH, dissolved salt concentration, and surface tension between pore fluid and Sc—$CO_2$.

Step 3 (1030) is estimating SC-$CO_2$ ganglion size. Ganglion size is estimated for entrapment for a given groundwater velocity. Ganglion size may be determined by Equation 12 above. The ganglia entrapment criteria are that the ganglion size must be small enough for the capillary force exerting on the ganglion to counter the buoyancy and the regional flow force Step 4A (1040) calculates injection rate and time intervals for alternating SC-$CO_2$ and fluid injections using equations 15-16.

Step 4B (1050) determines the vertical distance needed for ganglion formation from buoyancy using Equation 17. This step is optional and may be omitted if no vertical movement is considered.

Step 5 (1060) is SC-CO2 injection according to an injection strategy (e.g., alternating SC-CO2 injection or ganglion formation by buoyancy rising) designed at steps 3 and 4.

Step 6 (1070) uses geophysical detection and monitoring of ganglion size distribution, for example, using acoustic wave attenuation caused by the capillary resonance of SC-$SO_2$, ganglia to confirm that the ganglion size distribution predicted by Equation 6 is the size that immobilizes the ganglia. Step 6 is optional.

Step 7 (1080) is determining the long-term risk by analysis of the mobility and long-term stability of SC-$CO_2$ ganglia in subsurface using ganglion entrapment criteria (Equation 12).

It should be appreciated that measurements or determinations may be based on field measurements, lab measurements, approximations and/or estimates.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for storing a carbon dioxide in a geologic formation, comprising:
   injecting supercritical carbon dioxide and water or brine into the geologic formation under conditions of temperature, pressure and density and at an injection rate selected to cause the supercritical carbon dioxide to form ganglia that are immobilized by capillary trapping within the geologic formation.

2. The method of claim 1, wherein the supercritical carbon dioxide and water or brine are alternately injected into the geologic formation.

3. The method of claim 1, wherein the supercritical carbon dioxide and water or brine are mixed before being injected into the geologic formation.

4. The method of claim 3, wherein the supercritical carbon dioxide and water or brine are mixed to form a two phase mixture.

5. A method for storing a carbon dioxide in a geologic formation, comprising:
   injecting supercritical carbon dioxide and water or brine into the geologic formation under conditions of temperature, pressure and density and at an injection rate selected to cause the supercritical carbon dioxide to form ganglia that are immobilized by capillary trapping within the geologic formation;
   wherein the supercritical carbon dioxide and water or brine are mixed before being injected into the geologic formation; and
   wherein the supercritical carbon dioxide and water or brine are mixed to form a two phase mixture.

* * * * *